United States Patent
Namioka et al.

(10) Patent No.: US 10,380,730 B2
(45) Date of Patent: Aug. 13, 2019

(54) ANALYSIS APPARATUS AND ANALYSIS METHOD

(71) Applicant: Kabushiki Kaisha Toshiba, Minato-ku (JP)

(72) Inventors: Yasuo Namioka, Nerima (JP); Nobuaki Takahashi, Kamakura (JP); Hideki Yasui, Ota (JP); Masaya Motokubota, Yokohama (JP); Yuki Yatsushima, Yokohama (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 28 days.

(21) Appl. No.: 15/348,203

(22) Filed: Nov. 10, 2016

(65) Prior Publication Data

US 2017/0132780 A1 May 11, 2017

(30) Foreign Application Priority Data

Nov. 11, 2015 (JP) .................................. 2015-221145

(51) Int. Cl.
*G06T 7/00* (2017.01)
*G06K 9/00* (2006.01)
(Continued)

(52) U.S. Cl.
CPC ............ *G06T 7/0004* (2013.01); *G06F 3/011* (2013.01); *G06F 3/0346* (2013.01); *G06K 9/0053* (2013.01); *G06K 9/00335* (2013.01); *G06K 9/00342* (2013.01); *G06K 9/00362* (2013.01); *G06K 9/00885* (2013.01); *G06K 9/52* (2013.01);
(Continued)

(58) Field of Classification Search
None
See application file for complete search history.

(56) References Cited

U.S. PATENT DOCUMENTS 8,929,599 B2 * 1/2015 Komoto ............ G06K 9/00342
382/103
9,007,220 B2 * 4/2015 Johns .................... A61B 3/113
340/500

(Continued)

FOREIGN PATENT DOCUMENTS

JP 2013-16170 1/2013
JP 2015-109024 6/2015

OTHER PUBLICATIONS

Kouno et al., "Person Identification Using Top-view Image with Depth Information," 13th ACIS International Conference on Software Engineering, Artificial Intelligence, Networking and Parellel/Distributed Computing, 2012.*

(Continued)

*Primary Examiner* — Soo Shin
(74) *Attorney, Agent, or Firm* — Oblon, McClelland, Maier & Neustadt, L.L.P.

(57) ABSTRACT

According to one embodiment, an analysis apparatus includes an acquisition unit and a processor. The acquisition unit acquires first information with a first time length between a first time and a second time. The first information is based on motion of an object person. The processor extracts multiple similarity points from the first information. The multiple similarity points are similar to each other in the first information. The processor calculates a time interval between the similarity points.

15 Claims, 6 Drawing Sheets

(51) Int. Cl.
  *G06F 3/0346* (2013.01)
  *G06K 9/52* (2006.01)
  *G06K 9/62* (2006.01)
  *G06F 3/01* (2006.01)
(52) U.S. Cl.
  CPC .. *G06K 9/6215* (2013.01); *G06T 2207/30108* (2013.01)

(56) References Cited

U.S. PATENT DOCUMENTS

| | | | |
|---|---|---|---|
| 9,367,733 B2* | 6/2016 | Zhu | G06K 9/00369 |
| 9,501,915 B1* | 11/2016 | Laska | G08B 13/19606 |
| 9,619,868 B2* | 4/2017 | Ohba | G06T 5/00 |
| 2006/0039583 A1* | 2/2006 | Bickert | G06T 7/0012 |
| | | | 382/103 |
| 2009/0285301 A1* | 11/2009 | Kurata | H04N 19/51 |
| | | | 375/240.16 |
| 2015/0077323 A1* | 3/2015 | Ramaswamy | G06F 3/012 |
| | | | 345/156 |
| 2015/0339805 A1* | 11/2015 | Ohba | G06F 3/011 |
| | | | 345/156 |

OTHER PUBLICATIONS

Nanda et al., "A Robust Elliptical Head Tracker," Proceedings of the Sixth IEEE International Conference on Automatic Face and Gesture Recognition, 2004.*
Yuk, "A probabilistic framework for real-time head shape detection and tracking," M. Phil. Thesis, The University of Hong Kong, 2007.*
P. Lukowicz, et al., "Recognizing Workshop Activity Using Body Worn Microphones and Accelerometers" Pervasive, 2004, pp. 18-32.
Mario Aehnelt, et al., "Using Activity Recognition for the Tracking of Assembly Processes: Challenges and Requirements" WOAR 2014, 2014 pp. 12-21 and cover sheet.
D. Kouno, et al., "Person Identification with images from ceiling using depth information" MIRU2012, 2012, 6 pages.
R. Nakatani, et al., "Human Identification Using Camera Images Taken from Overhead Direction", Information Processing Society of Japan, MIRU, Jul. 20, 2011, p. 593-598 (with English-language machine translation).

* cited by examiner

ANALYSIS APPARATUS AND ANALYSIS METHOD

CROSS-REFERENCE TO RELATED APPLICATIONS

This application is based upon and claims the benefit of priority from Japanese Patent Application No. 2015-221145, filed on Nov. 11, 2015; the entire contents of which are incorporated herein by reference.

FIELD

Embodiments described herein generally relate to an analysis apparatus and an analysis method.

BACKGROUND

In a manufacturing site, various analyses have been adopted to improve efficiency of operations. For example, monitoring operation, measuring operation time, or recoding operation is carried out and the result is analyzed. However, such analyses take much time. Thus, an analysis apparatus capable of easily analyzing the operation is desired.

DETAILED DESCRIPTION

According to one embodiment, an analysis apparatus includes an acquisition unit and a processor. The acquisition unit acquires first information with a first time length between a first time and a second time. The first information is based on motion of an object person. The processor extracts multiple similarity points from the first information. The multiple similarity points are similar to each other in the first information. The processor calculates a time interval between the multiple similarity points.

First Embodiment

Figure 1:
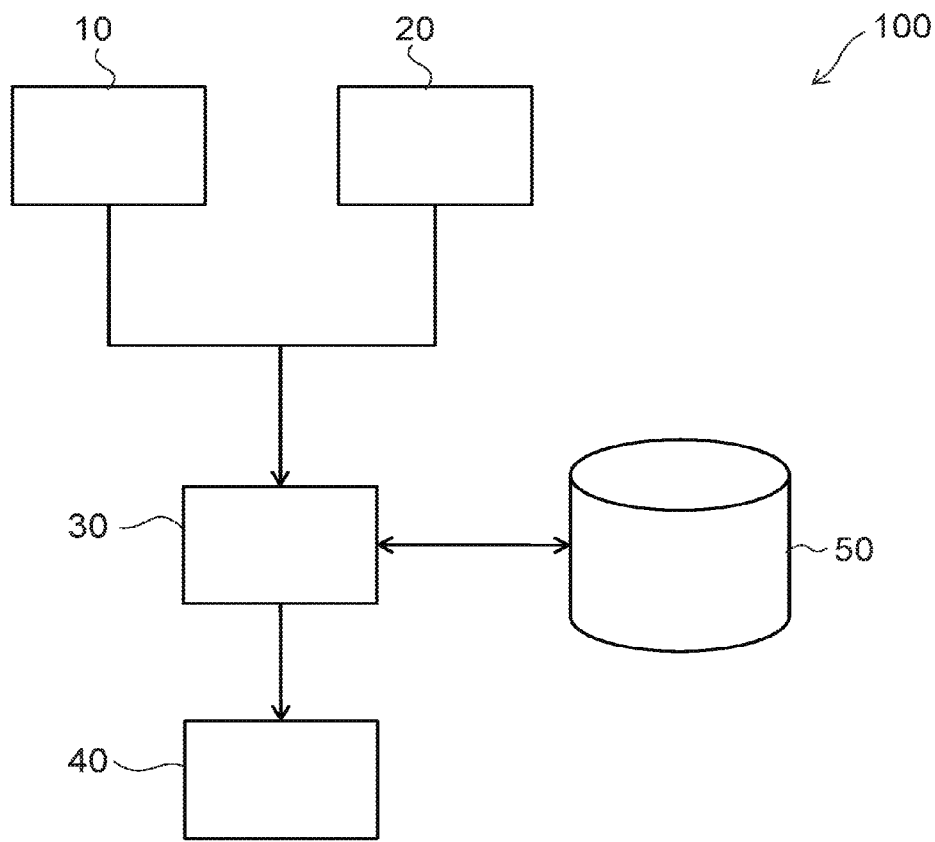
FIG. 1 is a schematic view showing a configuration of an analysis apparatus according to a first embodiment.

FIG. 1 is a schematic view showing a configuration of an analysis apparatus 100 according to a first embodiment.

As shown in FIG. 1, the analysis apparatus 100 comprises an input unit 10, an acquisition unit 20, a processor 30, a display unit 40, and a storage unit 50.

The input unit 10 is, for example, a keyboard, or a touch panel of a smartphone or a tablet. The user of the analysis apparatus 100 inputs information into the processor 30 using the input unit 10.

The acquisition unit 20 acquires information based on motion of a person to be analyzed. Length of time for which the acquisition unit 20 acquires information may be set using the input unit 10. Or the start and the end of the acquisition may be input by the person to be analyzed. The acquisition unit 20 outputs the acquired information toward the processor 30.

The acquisition unit 20 is, for example, a camera including a depth sensor. In such a case, the acquisition unit 20 is mounted where the person to be analyzed stays. The acquisition unit 20 acquires information relating to the motion of the person to be analyzed by recording the person.

Or, the acquisition unit 20 may be an acceleration sensor. In such a case, the acquisition unit 20 is worn on the arm or the leg of the person to be analyzed. The acquisition unit 20 acquires information relating to the motion of the person by sensing the acceleration of the body part.

The processor 30 processes the information received from the input unit 10 and the acquisition unit 20. The processor 30 is, for example, a CPU that stores software.

The storage unit 50 stores information. The processor 30 can refer to the storage unit 50 and extract necessary information.

The analysis apparatus 100 may not comprise the storage unit 50. In such a case, the processor 30 is connected to a hard disk of another apparatus, etc., via a network.

The display unit 40 visualizes the information that is output from the processor 30 and displays it to the user of the analysis apparatus 100. The display unit 40 is, for example, a liquid crystal display of a smartphone, a tablet, or a PC, etc.

The analysis apparatus 100 comprising such configuration is, for example, used to analyze motion of an operator in a manufacturing site. For example, in the case where the operator performs predetermined operation repeatedly, the analysis apparatus 100 is capable of extracting the required time for the operation by collecting information based on the motion of the operator and by analyzing the information. At this time, the analysis apparatus 100 is also capable of storing the required time to the storage unit 50 and displaying the required time on the display unit 40.

An example of the operation of the acquisition unit 20 and the processor 30 will now be specifically described referring to FIG. 2 to FIG. 12. The case where the acquisition unit 20 includes a depth sensor will now be described.

Figure 2:
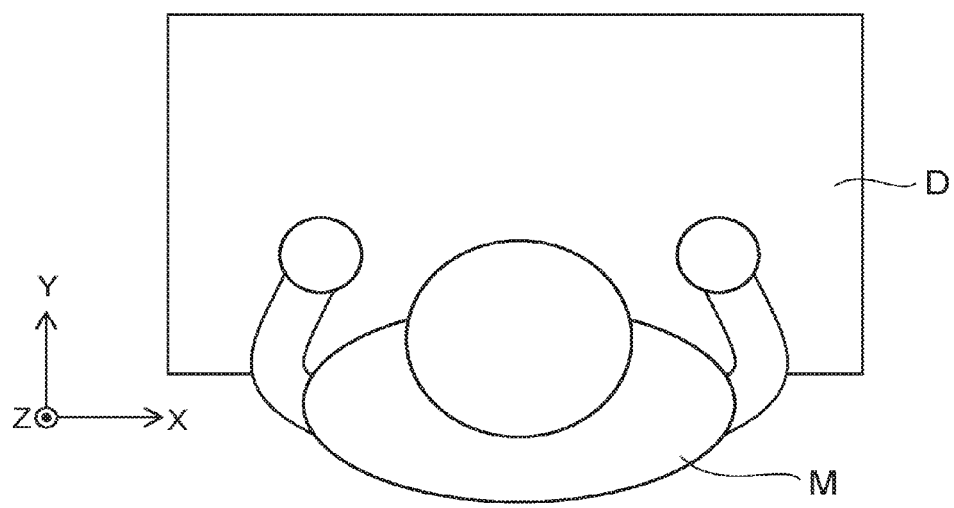
FIG. 2 is a schematic view showing a person to be analyzed.

FIG. 2 is a schematic view showing a person to be analyzed.

FIGS. 3, 4, 8, and 9 are graphs showing an example of information acquired by the acquisition unit 20.

FIGS. 5 to 7 and FIGS. 10 to 12 are graphs showing an example of information processing by the processor 30.

In FIGS. 3, 4, 8, and 9, the horizontal axis indicates the time and the vertical axis indicates the coordinate.

In FIGS. 5, 6, 10, and 11, the horizontal axis indicates the time and the vertical axis indicates the distance. In these graphs, it means that, as the value of the distance is larger, the distance between two objects becomes short and the correlation between them gets strong.

Figure 7:
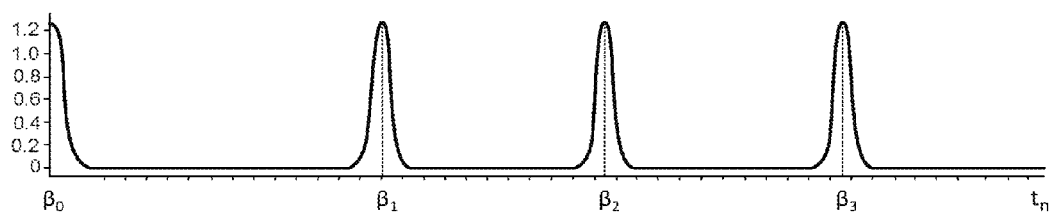
Figure 12:
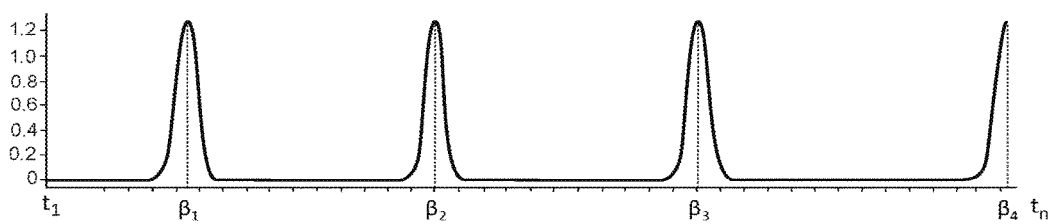

In FIGS. 7 and 12, the horizontal axis indicates the time and the vertical axis indicates the scalar value.

FIG. 2 shows a situation in which the operator M to be analyzed is operating on the desk D. FIG. 2 shows an example when viewed from the acquisition unit 20. In other words, in the example, the acquisition unit 20 is mounted directly above the operator M.

The acquisition unit 20 sets the coordinate of the recorded space, for example, as shown FIG. 2. In the example, when viewed from the operator M who is facing to the desk D, up and down direction is set as Z-axis, right and left direction is set as X-axis, and front and back direction is set as Y-axis.

The acquisition unit 20 senses a distance between the object and the acquisition unit 20 at each point on the X-Y coordinate plane. In other words, the acquisition unit 20 senses a depth at each point on the X-Y coordinate plane. In the case where the acquisition unit 20 records an image of the operator M shown in FIG. 2, the depth of the head is shallowest. And the depth becomes gradually deeper from the shoulders to the hands.

The acquisition unit 20 is capable of identifying body parts of the operator M and detecting the motion of the specific body part by sensing the depth at each point of the operator M. For example, the acquisition unit 20 determines the head of the operator M and traces the position of the head in the X-axis direction so as to detect the motion of the operator M.

Figure 3:
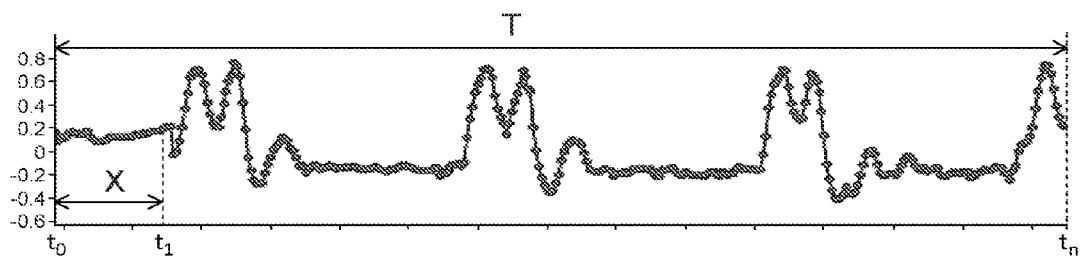
FIGS. 3 and 4 are graphs showing an example of information acquired by the acquisition unit.

FIG. 3 shows an example of the result detected by the acquisition unit 20. The acquisition unit 20 outputs the result information to the processor 30 and the processor 30 analyzes it.

In the example shown in FIG. 3, the acquisition unit 20 acquires first information with a time length T (a first time length) from time $t_0$ (first time) to time $t_n$ (second time). The processor 30 extracts part information with a time length X (a second time length) from the first information. The time length X is shorter than the time length T. In an example shown in FIG. 3, the processor 30 extracts the part information with the time length X from the time $t_0$ to the time $t_1$.

For example, the time lengths T and X are preset by the operator M or the manager of the manufacturing site. Or the time length T may be determined by which the operator M inputs the start and the end of the operation. In such a case, the time length T is from when the operator M inputs the start of the operation to when the operator M inputs the end of the operation.

Or the time length T may be set or modified by the processor 30 appropriately. For example, the operator M or the manger inputs an approximate period A of the operation into the processor 30 in advance; and the processor 30 may set integral multiple of the period A as the time length T.

Then, separately from the part information, the processor 30 extracts information with the time length X between the time $t_0$ to the time $t_n$ at predetermined time interval (a first time interval) from the first information. Specifically, as shown by the arrows in FIG. 4, the processor 30 extracts multiple information with the time length X from the first information while shifting the range by one frame between the time $t_0$ and the time $t_n$. It is noted that only a part of multiple information extracted by the processor 30 are indicated by the arrows in FIG. 4.

Figure 4:
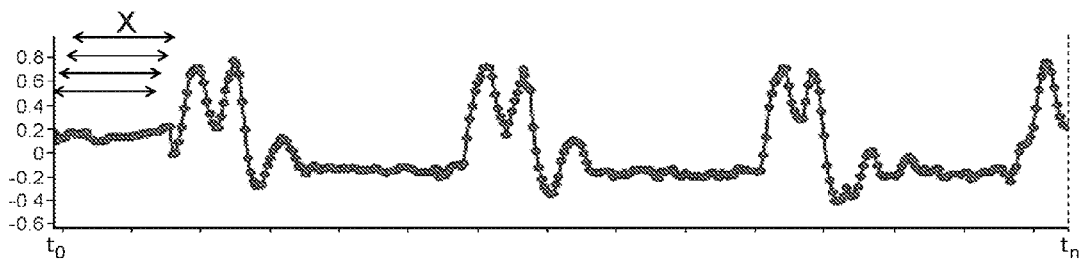

Hereinbelow, each of the multiple information extracted by the step shown in FIG. 4 is called comparison information.

Figure 5:
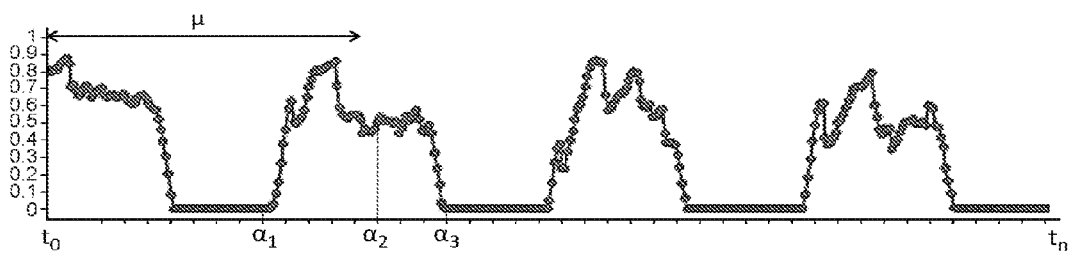
FIGS. 5 to 7 are graphs showing an example of information processing by the processor.

Then, the processor 30 calculates a distance between the part information that is extracted in the step shown in FIG. 3 and each of the multiple comparison information that is extracted in the step shown in FIG. 4. The processor 30 calculates, for example, Dynamic Time Warping (DTW) distance between the part information and each of the multiple comparison information. The processor 30 can obtain the strength of correlation between them using the DTW distance, regardless of the variation of the motion period of the operator M. Consequently, information of the distance between the part information and the first information at each time can be obtained. The information of the distances is shown in FIG. 5.

Hereinbelow, the information including the distance at each time is called first correlation information.

Then, the processor 30 sets a tentative similarity point on the first information to estimate the actual operation period of the operator M. The specific example of setting the tentative similarity point will now be described. As shown in FIG. 5, the processor 30 sets candidate points at random within the variation time N. The time after passage of a time length μ (a third time length) from the time $t_0$ is set as the center of the variation time N. In the example shown in FIG. 5, three candidate points are set at random.

The time μ and the variation time N are, for example, preset by the manager of the manufacturing site.

The processor 30 creates multiple data having normal distribution (third information). The normal distributions respectively have peaks at the candidate points $\alpha_1$ to $\alpha_m$. Then, the processor 30 calculates a correlation coefficient (a second correlation coefficient) between the first correlation information such as shown in FIG. 5 and each of the normal distributions. The processor 30 sets the candidate point which the correlation coefficient is highest as the tentative similarity point. In the example shown in FIG. 5, the candidate point $\alpha_2$ is set as the tentative similarity point.

Then, the processor 30 sets multiple candidate points $\alpha_1$ to $\alpha_m$ on the first information within the variation time N again. At this time, the time after passage of the time μ from the last tentative similarity point (the candidate point $\alpha_2$) is set as the center of the variation time N. By repeating the steps until the time $t_n$, the multiple tentative similarity points $\beta_1$ to $\beta_k$ are set between the time $t_0$ and the time $t_n$, as shown in FIG. 6.

Then, the processor 30 creates data including normal distributions that respectively have the peaks at the tentative similarity points $\beta_1$ to $\beta_k$, as shown in FIG. 7. Hereinbelow, data including the normal distributions such as shown in FIG. 7 is called second comparison information.

Figure 6:
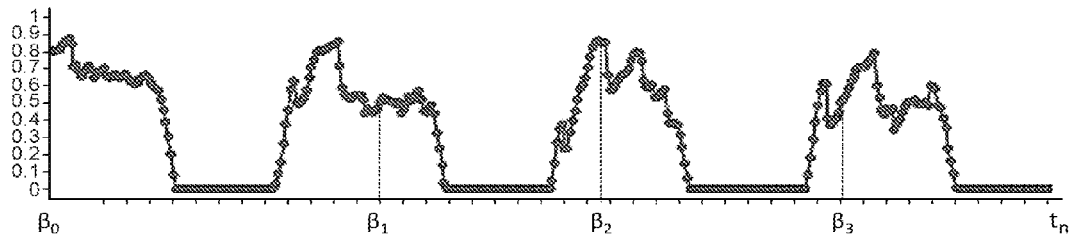

The processor 30 calculates the correlation coefficient (a first correlation coefficient) between the first correlation information such as shown in FIG. 5 and FIG. 6 and the second comparison information such as shown in FIG. 7.

Then, the processor 30 executes the same steps as shown in FIG. 3 to FIG. 7 to the other part information. FIG. 8 to FIG. 12 show the processing by the processor 30. It is noted that only information after the time $t_1$ is depicted in FIG. 8 to FIG. 12.

Figure 8:
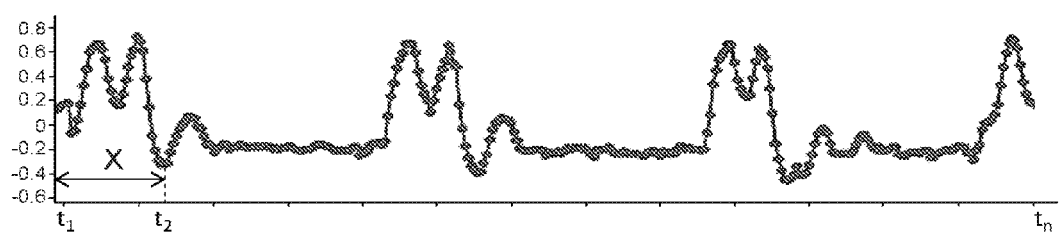
FIGS. 8 and 9 are graphs showing an example of information acquired by the acquisition unit.
Figure 9:
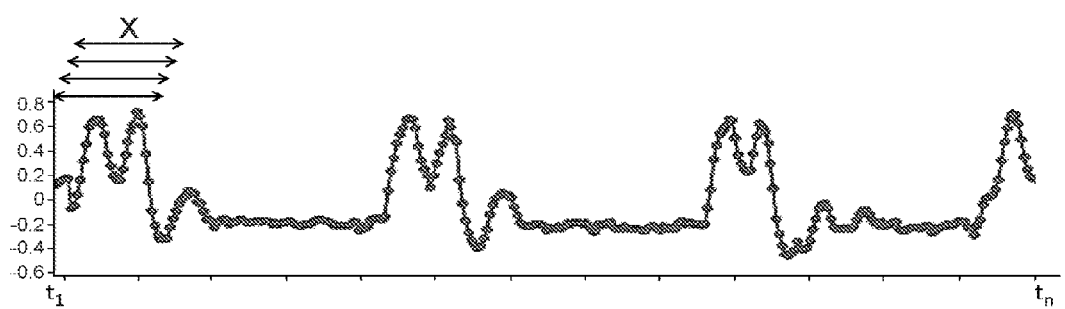

For example, as shown in FIG. 8, the processor 30 extracts the part information with the time length X between the time $t_1$ and the time $t_2$. Then, as shown in FIG. 9, the processor 30 extracts multiple comparison information with the time length X. The processor 30 creates first correlation information as shown in FIG. 10 by calculating a distance between the part information and each of the multiple comparison information.

Figure 10:
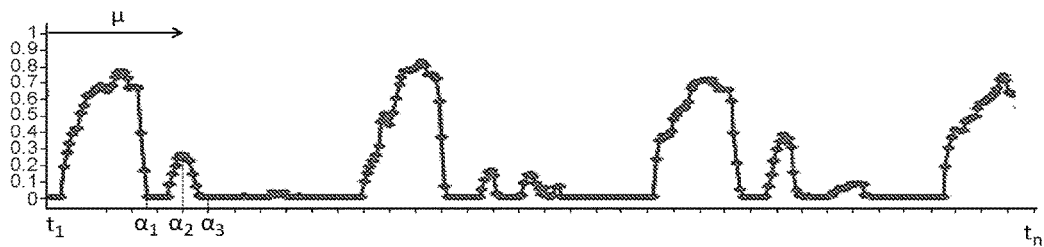
FIGS. 10 to 12 are graphs showing an example of information processing by the processor.
Figure 11:
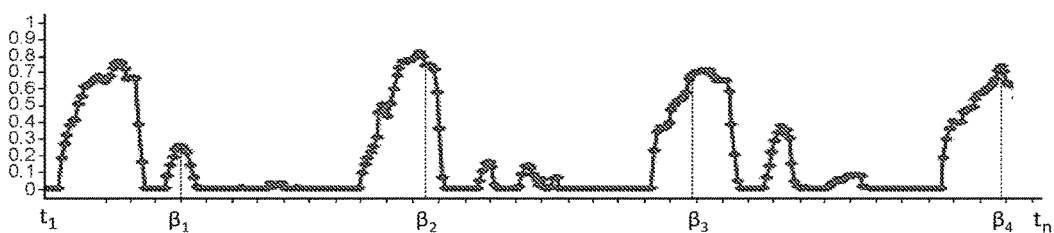

Then, as shown in FIG. 10, the processor 30 extracts the tentative similarity point β by setting candidate points $\alpha_1$ to $\alpha_m$ based on the time after passage of the time length μ from the time $t_1$. By repeating the steps, the tentative similarity points $\beta_1$ to $\beta_k$ are set as shown in FIG. 11.

Then, as shown in FIG. 12, the processor 30 creates second comparison information based on the tentative similarity points $\beta_1$ to $\beta_k$. The processor 30 calculates a correlation coefficient between the first correlation information such as shown in FIG. 10 and FIG. 11 and the second comparison information such as shown in FIG. 12.

The processor 30 calculates the correlation coefficient for each of the multiple part information by repeating the steps as described above after the time $t_2$. Multiple groups of the tentative similarity points $\beta_1$ to $\beta_k$ are created by repeating these steps. The processor 30 extracts one group of the tentative similarity points $\beta_1$ to $\beta_k$ that has the highest correlation coefficient as the true similarity points. The processor 30 obtains the operation period of the operator M by calculating the time intervals between the true similarity points. For example, the processor 30 calculates the average of time lengths between adjacent true similarity points and determines the average time as the operation period.

An example using the information acquired by the depth sensor is described above. However, the embodiment of the invention is not limited to the example. The operation period of the operator M can be obtained by acquiring acceleration information of the body part of the operator M and analyzing the acceleration information in the same way. In addition, the analysis apparatus 100 according to the embodiment can be widely applied to estimate the period not only for an operation in a manufacturing site but for an object that repeats specific motion.

According to the analysis apparatus 100, it is possible to automatically analyze motion period of a person to be analyzed. For example, as described above, it is possible to automatically analyze the operation period of the operator M in the manufacturing site. Therefore, the analysis of the operation can be easily performed, because it is not necessary for the operator to record or report for the analysis and not necessary for a technical staff to monitor or measure the operation to improve the efficiency. In addition, it is possible to obtain a period with higher accuracy because the analysis result does not depend on experience, knowledge, or assessment of the person who analyzes it.

The analysis apparatus 100 may comprise multiple acquisition units 20. In such a case, the acquisition units 20 may respectively acquire information of mutually-different operators. Or the acquisition units 20 may acquire information of one operator.

The analysis apparatus 100 may execute the analysis described above for multiple information which the starts of the time length T are different from each other. For example, in the case where the time length of the information to be analyzed is long, the analysis apparatus 100 divide the whole information into multiple information with shorter time lengths and execute the analysis for each of the multiple information. In such a case, the shorter time length after divided corresponds to the time length T. By applying such a method, it is possible to decrease required time for the analysis processing. It is also possible to analyze the divided information when the time length T passes so as to reflect the result in the operation while the operator is operating.

Modification

Figure 13:
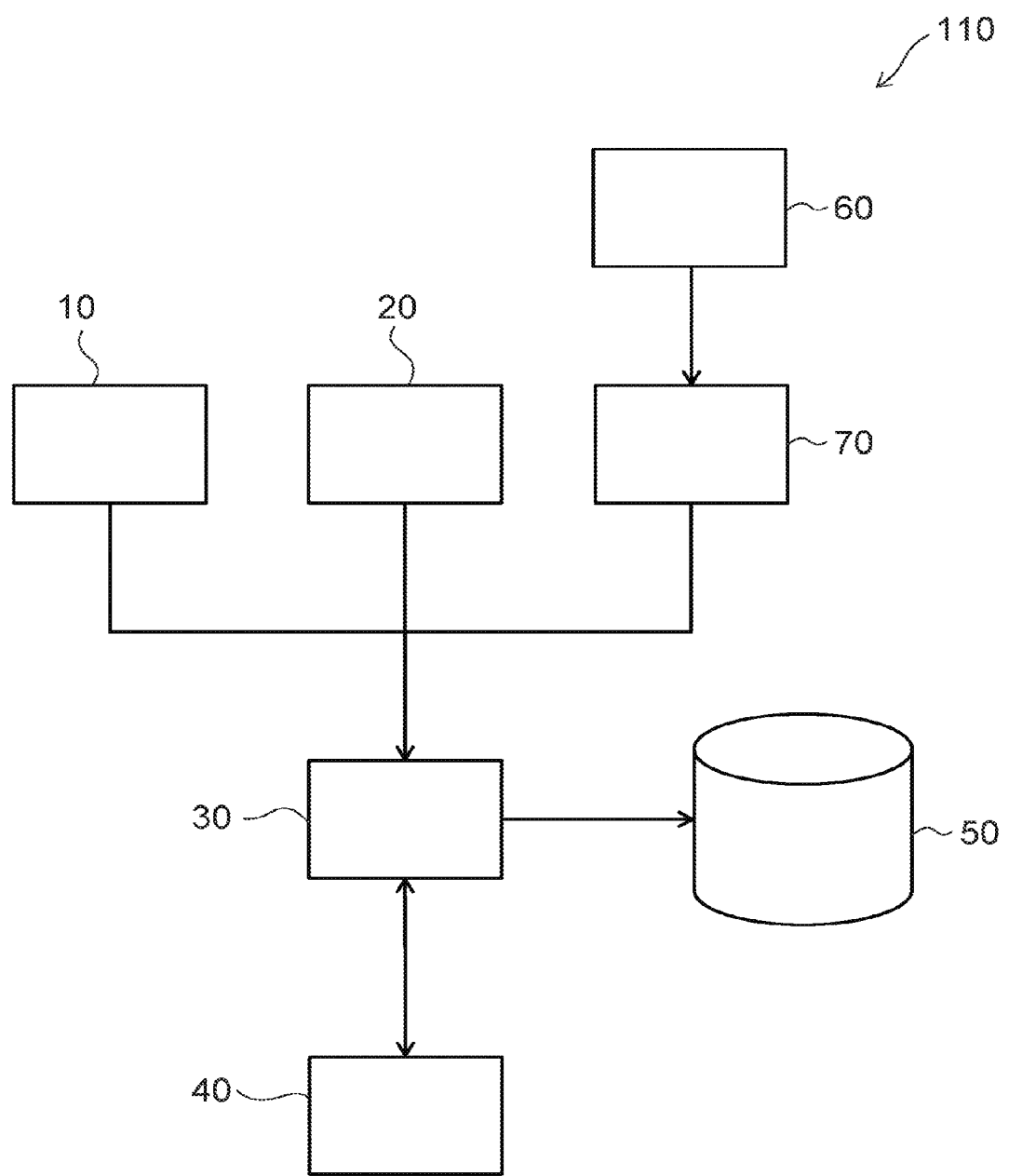
FIG. 13 is a schematic view showing an analysis apparatus 110 according to a modification of the first embodiment.

FIG. 13 is a schematic view showing an analysis apparatus 110 according to a modification of the first embodiment.

As shown in FIG. 13, the analysis apparatus 110 further includes a transmitter 60 and a receiver 70 in comparison with the analysis apparatus 100.

The transmitter 60 emits a signal including an ID of the transmitter 60. For example, the transmitter 60 is set so as to emit the signal at predetermined intervals. The signal emitted from the transmitter 60 may be directional or may be nondirectional.

The receiver 70 receives the signal emitted from the transmitter 60. The receiver 70 outputs the signal received from the transmitter 60 toward the processor 30.

The transmitter 60 is, for example, a beacon, a Radio Frequency IDentifier (an RFID), or the like provided in a manufacturing site. Or the transmitter 60 may be a beacon, an RFID, or the like that accompanies a processing material, a jig, or the like that is not fixed.

The receiver 70 is, for example, a tablet, a smartphone, or the like that can receive the signal emitted from the transmitter 60 via Bluetooth (registered trademark). In the case where the transmitter 60 is an RFID, an RF reader is used as the receiver 70. For example, the operator that executes the process in the manufacturing site possesses the receiver 20.

Or the operator may possess the transmitter 60. In such a case, the receiver 70 is provided in a manufacturing site or at manufacturing equipment. Or the transmitter 60 may accompany a processing material or a jig and the receiver 70 is provided in a manufacturing site or at manufacturing equipment.

The processor 30 converts the signal input from the receiver 70 into information. Thereby, the processor 30 obtains information, such as an ID of the transmitter 60, included in the signal emitted from the transmitter 60.

The storage unit 50 stores, for example, information such as process flows in the manufacturing site, processes included in the process flow, manufacturing equipment used in each process, a location where each process is executed, an operator that executes each process, an object processed by each process, etc.

The storage unit 50 also stores information related to locations or holders of the transmitter 60 and the receiver 70. For example, in the case where the transmitter 60 is provided in a manufacturing site, the storage unit 50 stores information on such as the process executed at the location where the transmitter 60 is provided, the processing material, the equipment used for the process, etc.

Therefore, the processor 30 can extract information related to the ID of the transmitter 60 from the storage unit 50 by collating the ID of the transmitter 60 input from the receiver 70 and by referring to the information related to the ID in the storage unit 50.

For example, the analysis apparatus 110 according to the modification acquires the information of the operation executed by the operator M, with using the transmitter 60 and the receiver 70; and it is possible to manage the information of the operation in association with the operation period.

Second Embodiment

Figure 14:
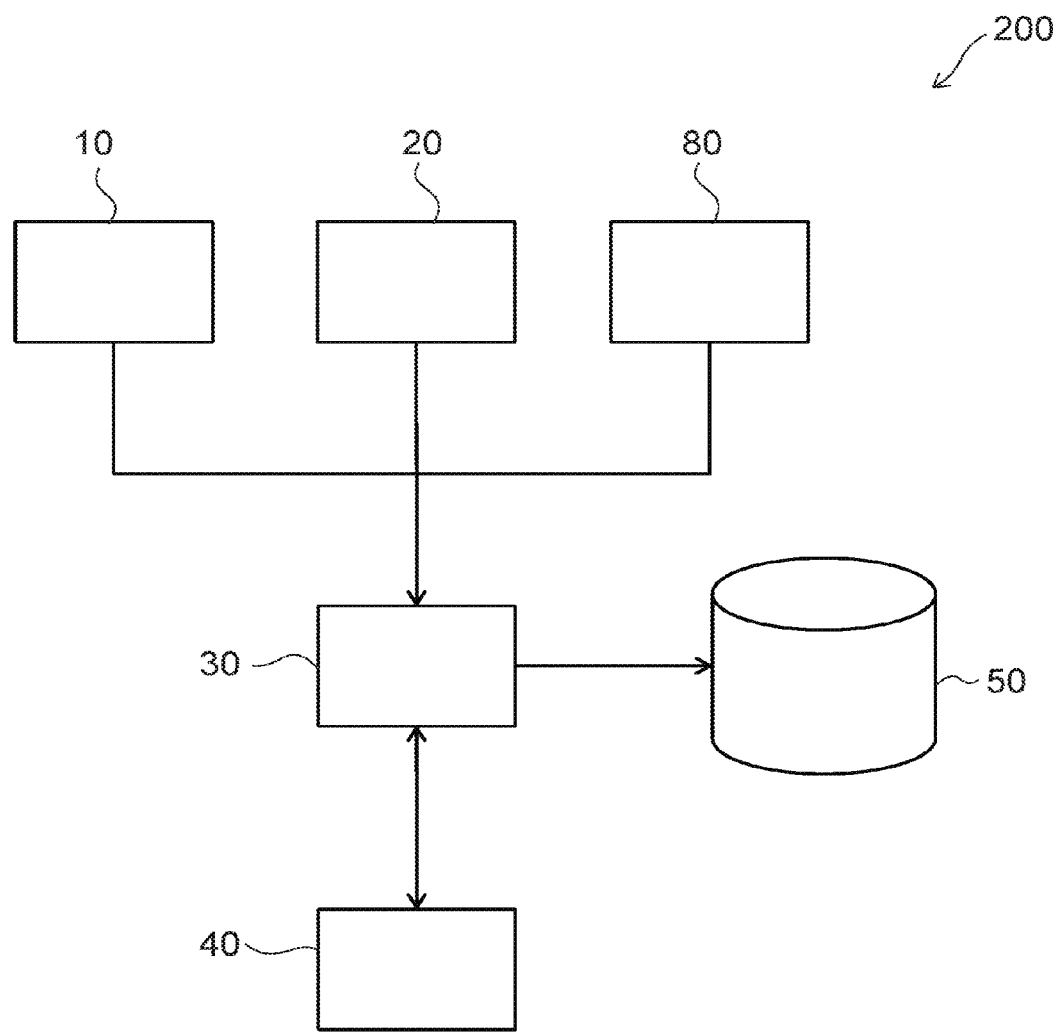
FIG. 14 is a schematic view showing a configuration of an analysis apparatus according to a second embodiment.

FIG. 14 is a schematic view showing a configuration of an analysis apparatus 200 according to a second embodiment.

As shown in FIG. 14, the analysis apparatus 200 further includes an imaging unit 80 in comparison with the analysis apparatus 100.

The imaging unit 80 records an image of the operator M; and the processor 30 identifies the operator M based on the recorded image. In the case where the acquisition unit 20 is a depth sensor, the processor 30 can identify the operator M based on the image recorded by the acquisition unit 20. In other words, one component may comprise both functions of the acquisition unit 20 and the imaging unit 80. The storage unit 50 stores information necessary to identify the operator M.

The following methods can be used to identify the operator M based on the recorded image. It is possible to combine two or more methods described below.

In the first method, skeleton information extracted from the recorded image is used for the identification.

In this method, the processor 30 extracts joint parts of the skeleton such as the shoulder, elbow, waist, knee, etc., and end parts of the skeleton such as the head, hand, foot, etc., of the operator M from the recorded image. Then, the processor 30 acquires skeleton information by linking the joint parts and the end parts. The processor 30 calculates the breadth of the shoulders, the lengths of the right and left upper arms, and the lengths of the right and left forearms based on the skeleton information. The processor 30 identifies the operator M by collating the calculated result to the information stored in the storage unit 50.

In the second method, the area of the specific body part of the operator M is used for the identification.

In this method, the processor 30 calculates the area of the specific body part of the operator M based on the recorded image. Then, the processor 30 collates the calculated result to the information stored in the storage unit 50 so as to identify the operator M. For example, the processor 30 identifies the operator M using the area of the right shoulder, the area of the left shoulder, or the sum of these areas.

In the third method, the posture of the operator M is used for the identification.

In this method, the processor 30 detects the posture of the operator M based on the recorded image. Specifically, the processor 30 acquires skeleton information in the same way as the first method. At the same time, the processor 30 detects the posture of the operator M such as the angle of the neck using the depth information of the recorded image. The processor 30 identifies the operator M by collating the detected posture to the information stored in the storage unit 50.

In the fourth method, the shape of the specific body part of the operator M is used for the identification.

In this method, the processor 30 detects the shape of the specific body part of the operator M based on the depth information. The processor 30 identifies the operator M by collating the detected shape to the information stored in the storage unit 50.

In the four methods exemplified above, an image of the operator M that is recorded from the front, the rear, the upper, or the side may be used to identify the operator.

The fourth method of the exemplified four methods will now be described. Specifically, the case where the operator M is identified based on the shape of the head will now be described. It is possible to execute same processing for the other body part of the operator M.

First, data stored in the storage unit 50 will be described. The data may be called training data.

The storage unit 50 stores data relating to multiple operators who have possibility to be analyzed. The storage unit 50 also stores an identifier to discriminate each operator from the others.

As a specific example, the storage unit 50 stores data relating to three operators of a first operator, a second operator, and a third operator. In such a case, the storage unit 50 stores data relating to the head shapes of the operators. The data includes multiple head shape for each operator. The data relating to the head shapes of each operator is, for example, an image recorded by the imaging unit 80. In other words, image data which the imaging unit 80 had recorded the head of the operator from directly above is stored in the storage unit 50.

The data of the head shape is converted, for example by Point Cloud, into characteristics so as to calculate the distance between the head shapes.

The storage unit 50 stores a distance between the first operator's characteristics is stored in the storage unit 50. The storage unit 50 also stores a distance between the first operator's characteristic and the second operator's characteristic and a distance between the first operator's characteristic and the third operator's characteristic. An identifier, for example derived by Support Vector Machine (SVM), multiple Kernel SVM, random forest, or neural net, is set for these distances. The distance between the first operator's characteristics and the distance between the first operator's characteristic and the other operator's characteristic are discriminated by the identifier.

Similarly, for each of the second operator and the third operator, the storage unit 50 stores the distance between the operator's characteristics and the distance between the operator's characteristic and the other operator's characteristic; and identifiers derived by multiple Kernel SVM are set for these distances.

The processor 30 identifies the operator M based on the information that is stored in the storage unit 50.

First, the processor 30 extracts data of a head shape of the operator M from the recorded image and converts the data into a characteristic. At this time, the processor 30 extracts multiple data from multiple images of the operator M and converts each of the multiple data into a characteristic. Then, the processor 30 removes an outlier from the obtained characteristics. For example, removing the outlier is performed by Agglomerative Hierarchical Clustering (AHC) method.

Then, the processor 30 selects multiple characteristics of the operator M and multiple characteristics of the first operator; and the processor 30 calculates the distances between the characteristics of the operator M and the characteristics of the first operator for multiple combinations. Continuing in the step, the processor 30 calculates a margin of each of the calculated distances to the identifier that discriminates the first operator from the other operators. Then the processor 30 calculates the sum of the margins.

Similarly, for the second operator and the third operator, the processor 30 calculates the margins to the identifiers that discriminate the second operator or the third operator from other operators; and the processor 30 calculates the sums of the margins.

Then the processor 30 determines an operator whom the highest margin is obtained as the operator M.

According to the embodiment, it is possible to automatically calculate the motion period of the person to be analyzed and identify the person. Therefore, when the period is calculated, it is not necessary to manually identify the analyzed person. For example, in a production site, it is possible to manage the operating period and the operator with automatically combining them.

It is also possible that the transmitter 60 and the receiver 70, described in the modification of the first embodiment, can be applied to the second embodiment. By such a configuration, it is possible to automatically acquire the operation period and information relating to, for example, the operator M and the operation. Therefore, it is possible to manage more information with automatically combining them.

Note

An analysis apparatus, comprising:

an acquisition unit acquiring first information with a first time length T between a first time $t_0$ and a second time $t_n$, the first information being based on motion of an object person; and a processor configured to execute a first step of extracting a plurality of second information (part information) with a second time length X from the first information at mutually-different times, the second time length X being shorter than the first time length T as shown in FIG. 3, a second step of extracting a plurality of third information (first comparison information) with the second time length X from the first information, the plurality of third information being extracted between the first time $t_0$ and the second time $t_n$ at first time intervals (e.g., one frame) as shown in FIG. 4, a third step of calculating distances between one of the plurality of second information (part information) and each of the plurality of third information (first comparison information) to create fourth information (first correlation information), the fourth information (first correlation information) including distances between the one of the plurality of second information (part information) and the first information at times that respectively correspond to the plurality of third information (first comparison information), wherein the times respectively corresponding to the plurality of third information may have one frame intervals, a fourth step of setting a plurality of candidate points $\alpha_1$ to $\alpha_m$ near a time after passage of a third time length $\mu$ from the first time $t_0$, a fifth step of creating a plurality of fifth information (third comparison information), the plurality of the fifth information (the third comparison information) having peak at the respective candidate points $\alpha_1$ to $\alpha_m$, a sixth step of calculating a second correlation coefficient between each of the plurality of the fifth information (the third comparison information) and the fourth information (the first correlation information), a seventh step of setting the candidate point which the second correlation coefficient is highest as a tentative similarity point $\beta_1$;

an eighth step of repeating the set of other candidate points near a time after passage of the third time length $\mu$ from the last tentative similarity point and executing the fifth step to the seventh step for the other candidate points to set other tentative similarity points $\beta_2$ to $\beta_k$ as shown in FIG. 6, and a ninth step of calculating a first correlation coefficient between the fourth information (the first correlation information) and sixth information (second comparison information) that is created based on the plurality of tentative similarity points $\beta_1$ to $\beta_k$, the processor repeating the third step to the ninth step for each of the other mutually-different second information (part information) extracted in the first step, determining one group of the plurality of tentative similarity points $\beta_1$ to $\beta_k$ corresponding to the fourth information (the first correlation information) which the first correlation coefficient is highest, and calculating time intervals between the one group of the plurality of tentative similarity points $\beta_1$ to $\beta_k$.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention. Moreover, above-mentioned embodiments can be combined mutually and can be carried out.

What is claimed is:

1. An analysis apparatus comprising:
    circuitry configured to acquire first information with a first time length between a first time and a second time, the first information being based on motion of an object person, the object person performing a plurality of physical motions between the first time and the second time, and each of the plurality of physical motions is a repeated motion that is associated with a first operation;
    a processor configured to:
        extract a plurality of similarity points respectively from the plurality of physical motions included in the first information, wherein each of the plurality of similarity points is associated with a single spatial coordinate within a fixed space,
        calculate a time interval between at least one pair of temporally adjacent similarity points of the plurality of similarity points as an operation period of the first operation,
        acquire information of the first operation, and
        output the operation period in association with the information of the first operation;
    imager circuitry configured to:
        record an image of the object person to acquire depth information,
        extract a head shape of the object person from the depth information to identify the object person, and
        output the operation period in association with the identified object person; and
    storage circuitry configured to store information relating to the identified object person in association with the operation period.

2. The analysis apparatus according to claim 1, wherein the processor is further configured to:
    extract part information with a second time length from the first information, the second time length is shorter than the first time length, and
    extract the plurality of similarity points using a distance between the first information and the part information.

3. The analysis apparatus according to claim 2, wherein the processor is further configured to:
    extract a plurality of first comparison information from the first information between the first time and the second time at a first time interval,
    calculate each distance between each of the plurality of the first comparison information and the part information to create first correlation information that includes a distance between the first information and the part information at each time,
    set a plurality of tentative similarity points based on the first correlation information,
    calculate a first correlation coefficient between the first correlation information and second comparison information that is created based on the plurality of tentative similarity points, and
    determine a suitability of the plurality of tentative similarity points using the first correlation coefficient.

4. The analysis apparatus according to claim 3, wherein the processor is further configured to:
    set a plurality of candidate points that are candidates for the tentative similarity point, the plurality of candidate points are temporally set after a third time length from the first time,
    create a plurality of third comparison information, the plurality of third comparison information respectively have peaks at the plurality of candidate points, calculate each second correlation coefficient between each of the plurality of the third comparison information and the first correlation information, set one of the candidate points which the second correlation coefficient is highest as the tentative similarity point, and set the plurality of similarity points by temporally repeating set of other candidate points after the third time length from the set tentative point.

5. The analysis apparatus according to claim 4, wherein the processor is further configured to:

extract a plurality of part information with the second time length from the first information at mutually-different time, calculate the first correlation coefficient for each of the plurality of the part information, and extract the plurality of tentative similarity points, based on the first correlation information which the first correlation coefficient is highest, as the plurality of similarity points.

6. The analysis apparatus according to claim 1, wherein the circuitry includes an acceleration sensor worn by the object person, and wherein the first information includes acceleration information of a body part of the object person.

7. The analysis apparatus according to claim 1, wherein the circuitry is further configured to:

acquire depth information when recording, and acquire the first information by detecting motion of a body part of the object person using the depth information.

8. The analysis apparatus according to claim 1, wherein the storage circuitry is further configured to store data that includes head shapes of a plurality of persons from a first person to an $N^{th}$ person, N is an integer equal to or greater than 2, the storage circuitry further configured to store a plurality of identifiers from a first identifier to an $M^{th}$ identifier, the $M^{th}$ identifier being used to discriminate the $M^{th}$ person from the other persons, M is an integer not less than 1 and not more than N, and wherein the processor is further configured to identify the object person using the extracted head shape and the plurality of identifiers from the first identifier to the $M^{th}$ identifier.

9. The analysis apparatus according to claim 8, wherein the processor is further configured to:

calculate each distance between the extracted head shape of the object person and each of the head shapes of the persons from the first person to the $N^{th}$ person, calculate respective margins between the distances and the identifiers from the first identifier to the $M^{th}$ identifier, and determine the person corresponding to the identifier which the calculated margin is highest as the object person.

10. The analysis apparatus according to claim 9, wherein the processor is further configured to associate the time interval with the person determined as the object person.

11. An analysis apparatus, comprising:

imager circuitry configured to record an image of an object person performing a first operation from a top-down view above the object person and acquire depth information from the top-down view above the object person; and a processor configured to:

extract a head shape of the object person from the image using the depth information, identify the object person based on the head shape;

a storage circuitry configured to store data that includes head shapes of a plurality of persons from a first person to an $N^{th}$ person, N is an integer equal to or greater than 2, the storage circuitry further configured to store a plurality of identifiers from a first identifier to an $M^{th}$ identifier, the $M^{th}$ identifier being used to discriminate the $M^{th}$ person from the other persons, M is an integer not less than 1 and not more than N, wherein the processor is further configured to:

calculate each distance between the extracted head shape of the object person and each of the head shapes of the persons from the first person to the $N^{th}$ person, calculate respective margins between the calculated distances and the identifiers from the first identifier to the $M^{th}$ identifier, and determine the person corresponding to the identifier which the calculated margin is highest as the object person.

12. An analysis method comprising:

a first step of acquiring first information based on motion of an object person, the first information with a first time length between a first time and a second time, the object person performing a first operation repeatedly between the first time and the second time;

a second step of extracting a plurality of part information with a second time length from the first information at mutually-different times, the second time length being shorter than the first time length;

a third step of extracting a plurality of first comparison information with the second time length from the first information, the plurality of third information being extracted between the first time and the second time at first time intervals;

a fourth step of calculating distances between one of the plurality of part information and each of the plurality of first comparison information create first correlation information, the first correlation information including distances between the one of the plurality of part information and the first information at times respectively corresponding to the plurality of first comparison information;

a fifth step of temporally setting a plurality of candidate points after a third time length from the first time;

a sixth step of creating a plurality of third comparison information, the plurality of the third comparison information having peak at the respective candidate points;

a seventh step of calculating a second correlation coefficient between each of the plurality of the third comparison information and the first correlation information;

an eighth step of setting the candidate point which the second correlation coefficient is highest as a tentative similarity point;

a ninth step of temporally repeating the set of other candidate points after the third time length from the last tentative similarity point and executing the sixth step to the eighth step for the other candidate points to set other tentative similarity points;

a tenth step of calculating a first correlation coefficient between the first correlation information and second comparison information that is created based on the plurality of tentative similarity points, repeating the fourth step to the tenth step for each of the other mutually-different part information extracted in the second step, determining one group of the plurality of tentative similarity points corresponding to the first correlation information which the first correlation coefficient is highest, and calculating time intervals between the one group of the plurality of tentative similarity points;

an eleventh step of acquiring depth information by recording the object person;

a twelfth step of extracting a head shape of the object person from the depth information;

a thirteenth step of using data that relates to head shapes of a plurality of persons from a first person to an $N^{th}$ person and a plurality of identifiers from a first identifier to an $M^{th}$ identifier so as to calculate distances between the extracted head shape of the object person and the head shapes of the plurality of persons, N is an integer equal to or greater than 2, the $M^{th}$ identifier being used to discriminate the $M^{th}$ person from other persons, M is an integer not less than 1 and not more than N;

a fourteenth step of calculating respective margins between the calculated distances and the plurality of identifiers from the first identifier to the $N^{th}$ identifier; and a fifteenth step of determining the person corresponding to the identifier which the calculated margin is highest as the object person.

13. The analysis method according to claim 12, wherein the first information includes acceleration information of a body part of the object person.

14. The analysis method according to claim 12, wherein the first information includes a detected result of motion of a body part of the object person, the detection is based on depth information acquired by recording the object person.

15. The analysis method according to claim 12, further comprising a sixteenth step of associating the time interval with the person determined as the object person.

* * * * *